United States Patent
Tsai et al.

(10) Patent No.: US 12,269,593 B2
(45) Date of Patent: Apr. 8, 2025

(54) WING ASSEMBLIES AND AIRCRAFT

(71) Applicant: The Boeing Company, Chicago, IL (US)

(72) Inventors: Kevin R. Tsai, Seattle, WA (US); Tu Q. Vo, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 197 days.

(21) Appl. No.: 17/979,425

(22) Filed: Nov. 2, 2022

(65) Prior Publication Data
US 2024/0140589 A1 May 2, 2024

(51) Int. Cl.
*B64C 9/20* (2006.01)
*B64C 9/02* (2006.01)
*B64C 25/16* (2006.01)

(52) U.S. Cl.
CPC ............... *B64C 9/20* (2013.01); *B64C 9/02* (2013.01); *B64C 25/16* (2013.01)

(58) Field of Classification Search
CPC ............. B64C 9/20; B64C 9/02; B64C 25/16; B64C 9/16
See application file for complete search history.

(56) References Cited

U.S. PATENT DOCUMENTS

| | | | | |
|---|---|---|---|---|
| 2,502,315 | A * | 3/1950 | Earhart | B64C 9/16 244/216 |
| 4,471,927 | A * | 9/1984 | Rudolph | B64C 9/16 244/215 |
| 4,614,320 | A * | 9/1986 | Rutan | B64C 9/18 244/218 |
| 4,705,236 | A * | 11/1987 | Rudolph | B64C 9/16 244/90 R |
| 9,511,851 | B2 * | 12/2016 | Langtry | B64C 23/005 |
| 2002/0121319 | A1 * | 9/2002 | Chakrabarti | C22F 1/053 148/417 |
| 2005/0067526 | A1 * | 3/2005 | Quayle | B64C 25/10 244/15 |
| 2015/0083853 | A1 * | 3/2015 | Moser | B64C 9/16 244/99.3 |
| 2016/0046365 | A1 * | 2/2016 | González Gonzalbo | B64C 25/34 244/13 |
| 2018/0037314 | A1 * | 2/2018 | Wilson | B64C 25/04 |
| 2019/0291851 | A1 * | 9/2019 | Wagner | B64C 9/16 |
| 2021/0114714 | A1 * | 4/2021 | Tsai | B64C 9/06 |
| 2024/0124123 | A1 * | 4/2024 | Tsai | B64C 9/18 |
| 2024/0140589 | A1 * | 5/2024 | Tsai | B64C 9/16 |

* cited by examiner

*Primary Examiner* — Joshua J Michener
*Assistant Examiner* — Cindi M Curry
(74) *Attorney, Agent, or Firm* — Kolitch Romano Dascenzo Gates LLC

(57) ABSTRACT

Wing assemblies comprise one or more wing support structures, an inboard-most flap, and one or more flap supports that operatively couple the inboard-most flap to the wing support structure(s). The flap support(s) comprise at least an inboard-most inboard-flap support that is outboard of the inboard edge of the inboard-most flap.

20 Claims, 7 Drawing Sheets

WING ASSEMBLIES AND AIRCRAFT

FIELD

The present disclosure relates to wing assemblies and aircraft.

BACKGROUND

Flaps are high-lift devices used to reduce the stall speed of an aircraft and thus reduce the take-off and landing distances of an aircraft. Flaps are mounted along the trailing edges of the wings. In large commercial aircraft, each wing often includes more than one flap, including an inboard-most flap that is positioned adjacent to the fuselage relative to one or more outboard flaps. Historically, in large commercial aircraft, inboard-most flaps are at least partially supported and actuated by structures that are internal to the fuselage, resulting in a complex assembly.

SUMMARY

Wing assemblies comprise one or more wing support structures, an inboard-most flap, and one or more flap supports that operatively couple the inboard-most flap to the wing support structure(s). The inboard-most flap comprises an inboard edge and an outboard edge. The flap support(s) comprise at least an inboard-most inboard-flap support that is outboard of the inboard edge of the inboard-most flap, and the inboard-most flap is configured to move relative to the flap support(s) between a stowed position and a range of deployed positions.

In some examples, the wing support structure(s) comprise a landing gear beam that is configured to support a landing gear, and the inboard-most inboard-flap support is mounted to the landing gear beam.

Some examples of wing assemblies further comprise a landing gear door that is configured to be selectively opened for deployment of a landing gear and closed for stowage of the landing gear, and an inboard-most inboard-flap-support fairing that is operatively mounted relative to the inboard-most inboard-flap support. The inboard-most inboard-flap-support fairing comprises an aft fairing-portion that is fixed relative to and moves with the inboard-most flap, and a forward fairing-portion that is fixed relative to and moves with the landing gear door.

DESCRIPTION

Figure 1:
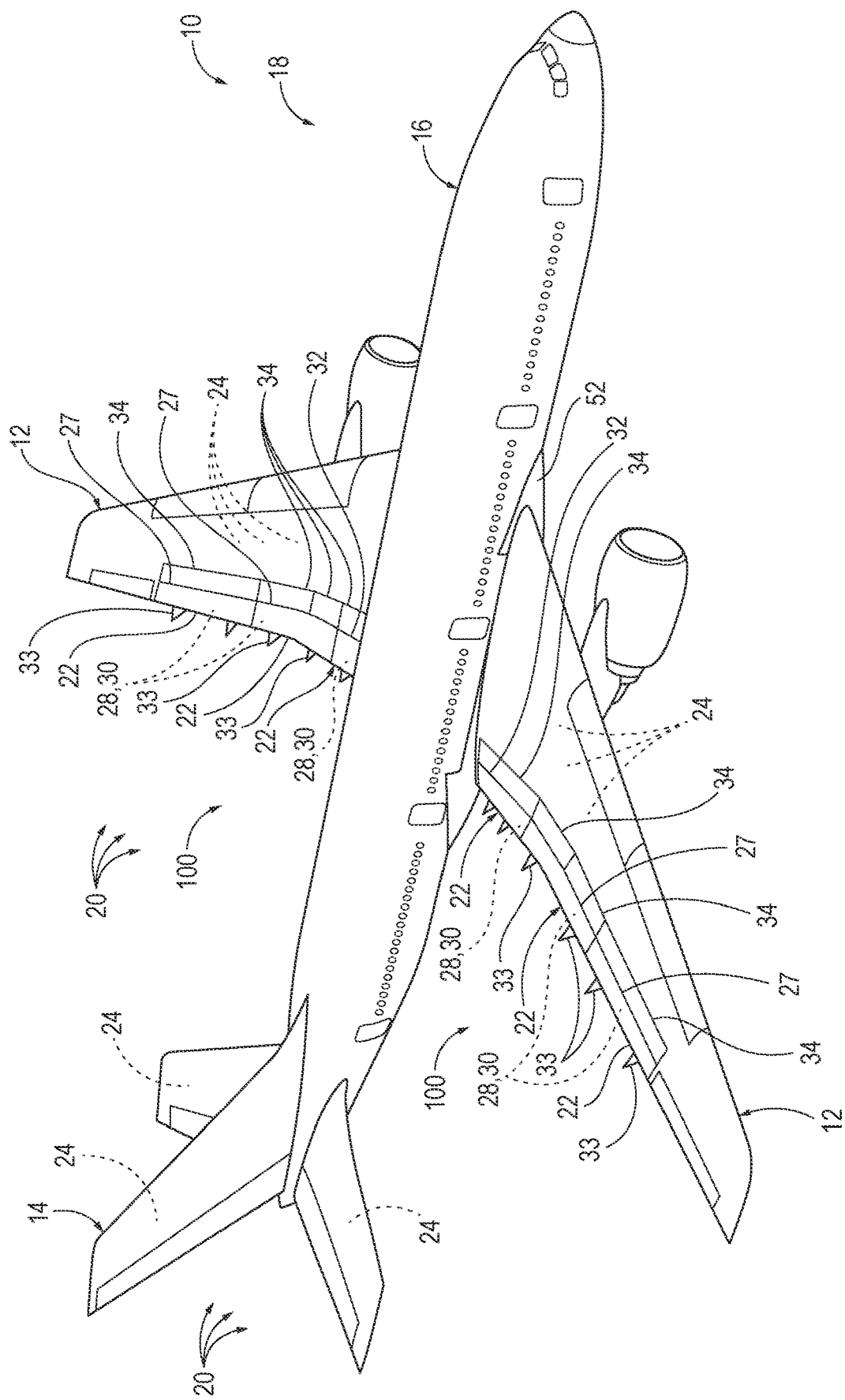
FIG. 1 is an illustration of an example aircraft.
Figure 2:
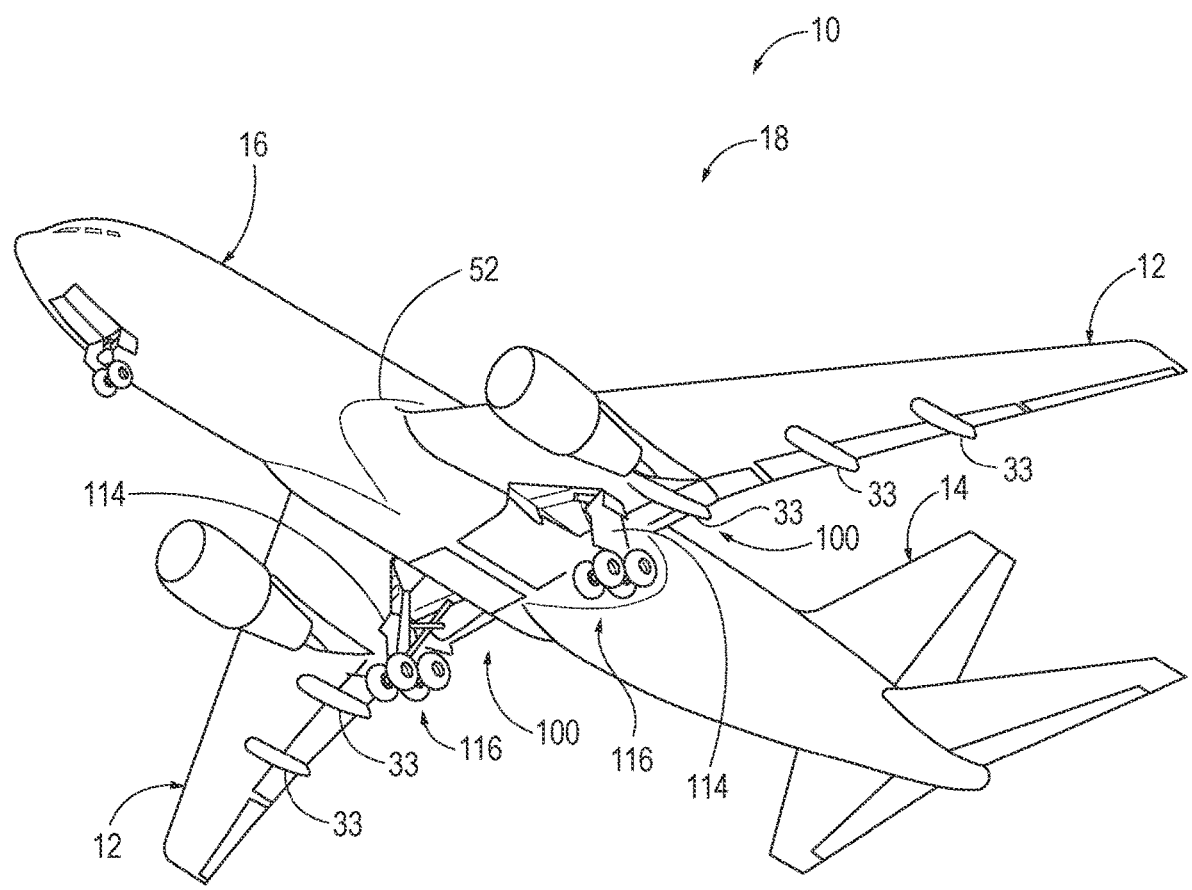
FIG. 2 is another illustration of an example aircraft.
Figure 3:
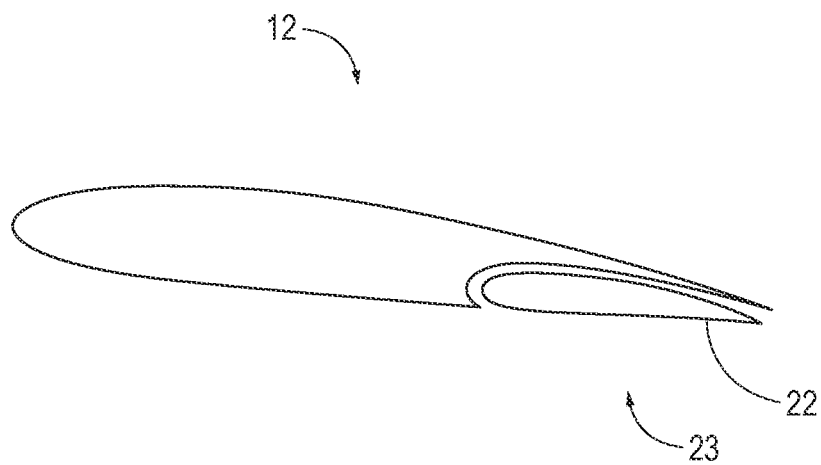
FIG. 3 is a schematic illustration of a wing with a flap in a stowed position.
Figure 4:
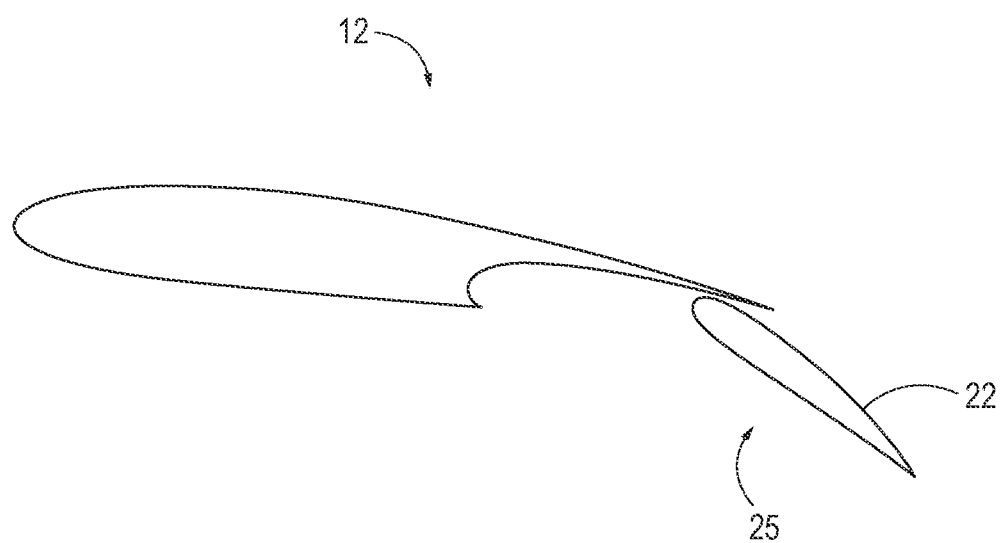
FIG. 4 is a schematic illustration of a wing with a flap in a deployed position.

FIGS. 1 and 2 are schematic representations of aircraft 10 that may comprise wing assemblies 100 according to the present disclosure. While aircraft 10 are depicted as fixed-wing airliners, aircraft 10 and wing assemblies 100 according to the present disclosure are not limited to such examples, and aircraft 10 may be fixed wing aircraft, commercial aircraft, military aircraft, passenger aircraft, autonomous aircraft, rotorcraft, etc. Aircraft 10 typically include wings 12 and a tail 14 that are supported by a fuselage 16 to form and/or define an airframe 18. The wings 12 and the tail 14 include a plurality of flight control surfaces 20, including flaps 22, that are configured to be selectively moved relative to wing support structures 24 of the wings 12 or the tail 14. Flaps 22 are high-lift devices used to reduce the stall speed of an aircraft 10 and thus reduce the take-off and landing distances of an aircraft 10. Flaps 22 are mounted along the trailing edges of the wings 12. In large commercial aircraft, each wing 12 often includes more than one flap 22, including an inboard-most flap 32 positioned adjacent to the fuselage 16 relative to one or more outboard flaps 27. With reference to FIGS. 3 and 4, flaps 22 are configured to be operatively transitioned between a stowed position 23 and a range of deployed positions, such as represented at 25.

Examples of wing support structures 24 include spars, ribs, or other underlying framework of a wing 12 or a tail 14. A flap 22 is operatively coupled to one or more wing support structures 24 by one or more flap supports 28 and is actuated by one or more flap actuators 30 that are operatively coupled between one or more wing support structures 24 and the flap 22. To reduce drag associated with the flap supports 28, wings 12 often include flap-support fairings 33 associated with the flap supports 28.

Flight control surfaces 20 also may include spoilers 34 positioned adjacent to and/or associated with a corresponding flap 22.

Historically, in large commercial aircraft, an inboard-most flap 32 may have an inboard flap support 28 that is positioned inboard of the flap itself. In such configurations, the inboard flap support 28 may be positioned internal to the fuselage 16 and/or an associated a wing-body fairing 52, resulting in a complex assembly.

Figure 5:
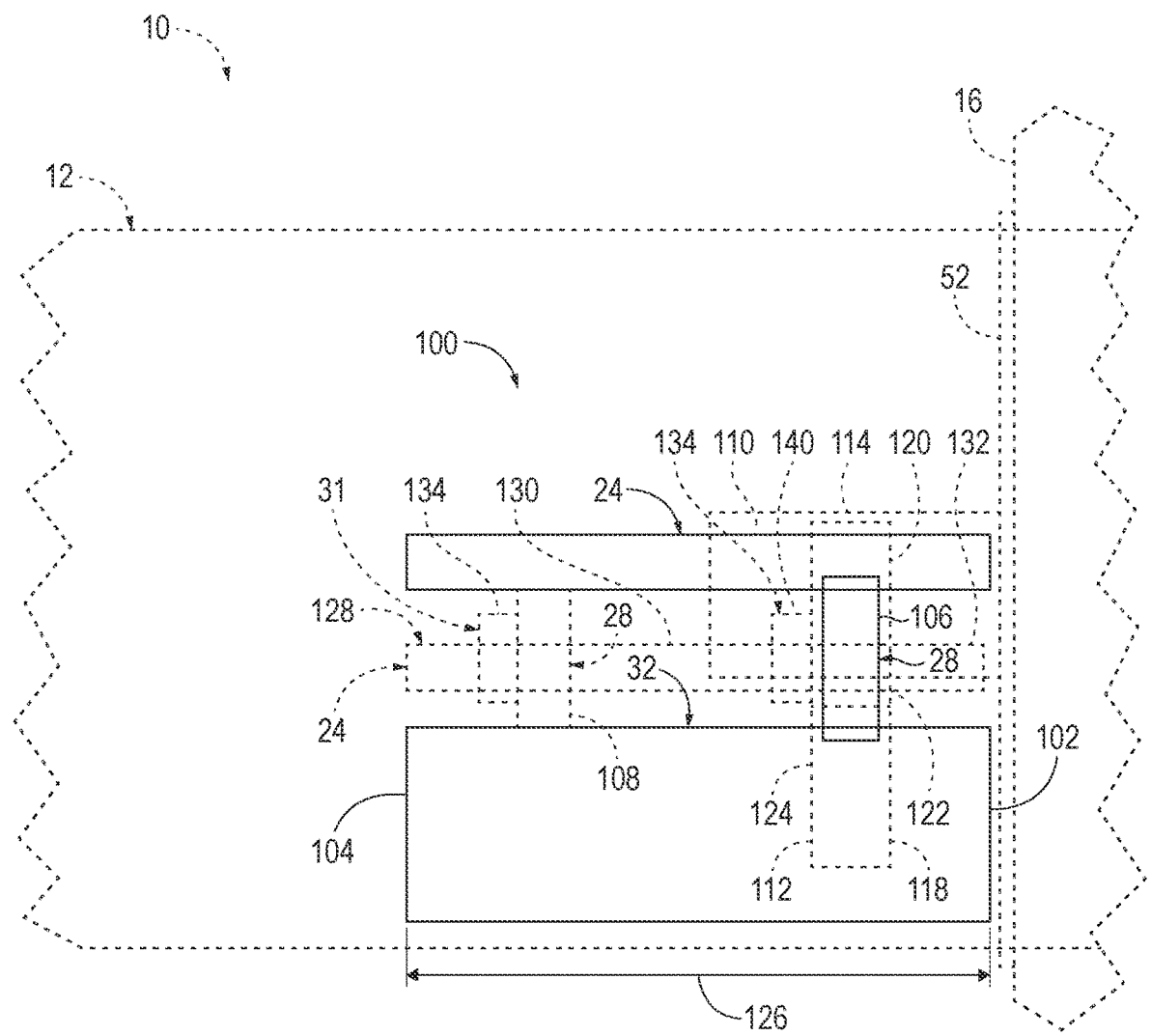
FIG. 5 is a schematic diagram representing wing assemblies and aircraft according to the present disclosure.

Turning now to FIG. 5, wing assemblies 100 and aircraft 10 according to the present disclosure are schematically represented. Generally, in FIG. 5, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

As schematically represented in FIG. 5, wing assemblies 100 comprise at least one or more wing support structures 24, an inboard-most flap 32, and one or more flap supports 28. The inboard-most flap 32 comprises an inboard edge 102 and an outboard edge 104. The flap support(s) 28 operatively couple the inboard-most flap 32 to the wing support structure(s) 24, and the flap support(s) 28 comprise at least an inboard-most inboard-flap support 106 that is outboard of an inboard edge 102 of the inboard-most flap 32, and the inboard-most flap 32 is configured to move relative to the one or more flap supports 28 between a stowed position 23 and a range of deployed positions 25, as represented in FIGS. 3 and 4.

In some examples, the wing support structure(s) 24 comprise a landing gear beam 110 that is configured to support a landing gear 116, and the inboard-most inboard-flap support 106 is mounted to the landing gear beam 110. In other words, in some wing assemblies 100 and aircraft 10, the landing gear beam 110 is utilized not only to support a landing gear 116 but also to at least partially support the inboard-most flap 32. Landing gear beams 110 of aircraft 10 tend to be very robust in accordance with the forces experienced during take-off and landing, as well as supporting the weight of the aircraft 10 itself while on the ground. Accordingly, without significant design changes, landing gear beams 110 may be utilized to support and react against the forces of the inboard-most flap 32.

In some examples, wing assemblies 100 further comprise a landing gear door 114 and an inboard-most inboard-flap-support fairing 112 that is operatively mounted relative to the inboard-most inboard-flap support 106. When present, the landing gear door 114 is configured to be selectively opened for deployment of the landing gear 116 and closed for stowage of the landing gear 116. As schematically represented in FIG. 5, the inboard-most inboard-flap-support fairing 112 comprises an aft fairing-portion 118 and a forward fairing-portion 120. The aft fairing-portion 118 is fixed relative to and moves with the inboard-most flap 32, while the forward fairing-portion 120 is fixed relative to and moves with the landing gear door 114. In some examples, as schematically represented in FIG. 5, the inboard-most inboard-flap-support fairing 112 further comprises a fixed fairing-portion 122 that is fixed relative to the inboard-most inboard-flap support 106. That is, in some examples, the inboard-most inboard-flap-support fairing 112 has three portions that define a continuous fairing surface 124 when the landing gear door 114 is closed and when the inboard-most flap 32 is in the stowed position 23.

As schematically represented in FIG. 5, in some examples of wing assemblies 100, the wing support structure(s) 24 comprise a spoiler beam 128 that is configured to support a spoiler 34, and the inboard-most inboard-flap support 106 extends through the spoiler beam 128. In some such examples, the spoiler beam 128 comprises an inboard spoiler-beam portion 132 and an outboard spoiler-beam portion 130, and the inboard-most inboard-flap support 106 extends between the inboard spoiler-beam portion 132 and the outboard spoiler-beam portion 130. In some examples, the inboard-most inboard-flap support 106 is coupled to the spoiler beam 128. That is, in some examples, the inboard-most inboard-flap support 106 is supported by the landing gear beam 110 and the inboard-most inboard-flap support 106 supports the spoiler beam 128. In other examples, the inboard-most inboard-flap support 106 is supported by the landing gear beam and extends through but does not support the spoiler beam 128.

As schematically represented in FIG. 5, some wing assemblies 100 further comprise one or more inboard-most-flap actuators 134 that are operatively coupled between the wing support structure(s) 24 and the inboard-most flap 32 and that are configured to operatively move the inboard-most flap 32 between the stowed position 23 and the deployed positions 25. In some such examples, the inboard-most-flap actuator(s) 134 comprise an inboard-most actuator 140 that is associated with the inboard-most inboard-flap support 106. In such examples where the inboard-most inboard-flap support 106 is mounted to the landing gear beam 110, the inboard-most actuator 140 may be positioned between the landing gear beam 110 and the spoiler beam 128, resulting in a compact arrangement in the chordwise direction of the wing 12.

With continued reference to FIG. 5, in some examples of wing assemblies 100, the flap support(s) 28 further comprise an outboard-most inboard-flap support 108 that is outboard of the inboard-most inboard-flap support 106 and that is inboard of an outboard edge 104 of the inboard-most flap 32. As schematically represented in FIG. 5, the inboard-most flap 32 may be described as having a (spanwise) flap length 126, and the inboard-most inboard-flap support 106 may be positioned outboard of the inboard edge 102 by X percentage of the flap length 126, while the outboard-most inboard-flap support 108 is positioned inboard of the outboard edge 104 within X±10 percentage of the flap length 126. In other words, in such an arrangement, the inboard-most inboard-flap support 106 and the outboard-most inboard-flap support 108 may be similarly positioned with respect to the adjacent edges of the inboard-most flap 32, thereby resulting in a somewhat evenly spaced arrangement and application of forces to the inboard-most flap 32. As a more specific example, X may be 10-40 inclusive. This somewhat even or uniform spacing of the outboard-most inboard-flap support 108 and the inboard-most inboard-flap support 106 is possible only because the inboard-most inboard-flap support 106 is positioned outboard of the fuselage 16. As discussed, in some examples, it is the support of the landing gear beam 110 that facilitates this arrangement.

As schematically represented in FIG. 5, in some examples of wing assemblies 100, none of the flap support(s) 28 extend into or are positioned within the fuselage 16, or a wing-body fairing 52. Moreover, in some examples, the inboard-most actuator 140 is not positioned within the fuselage 16, or a wing-body fairing 52.

Figure 6:
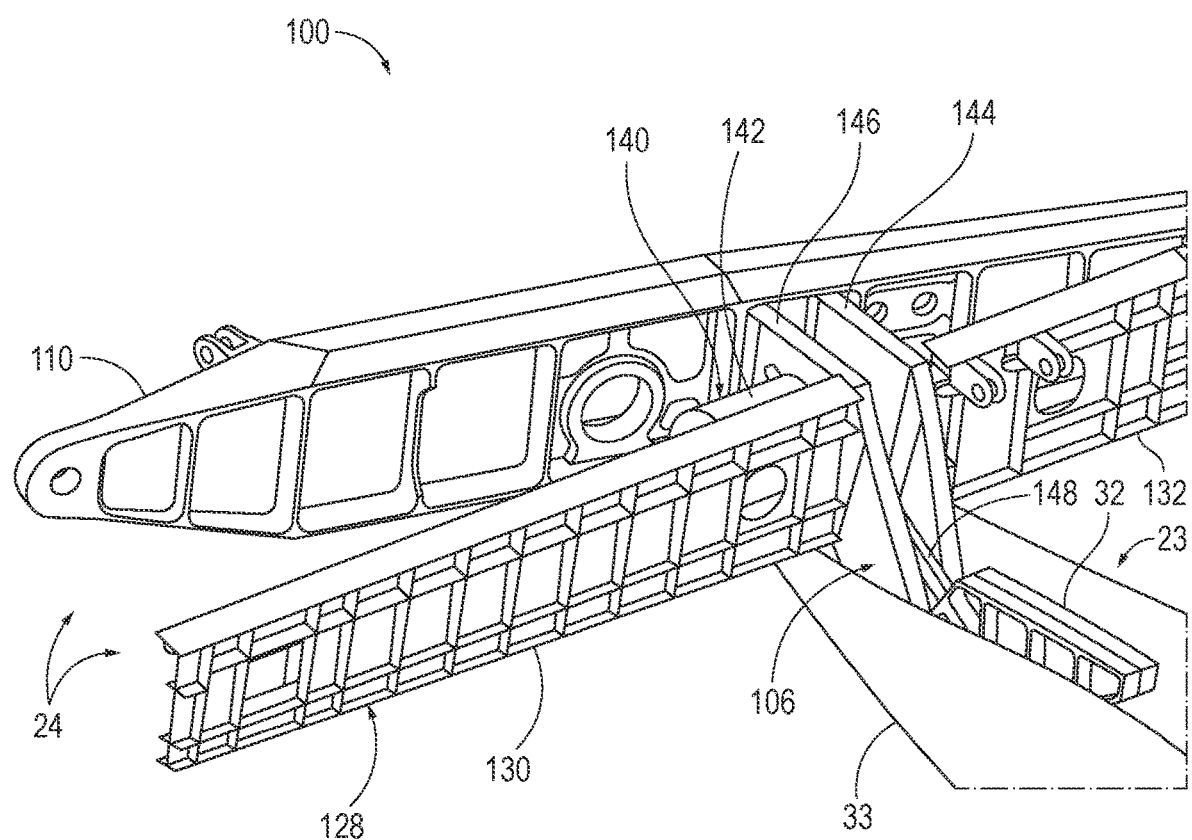
FIG. 6 illustrates a portion of an example wing assembly according to the present disclosure.
Figure 7:
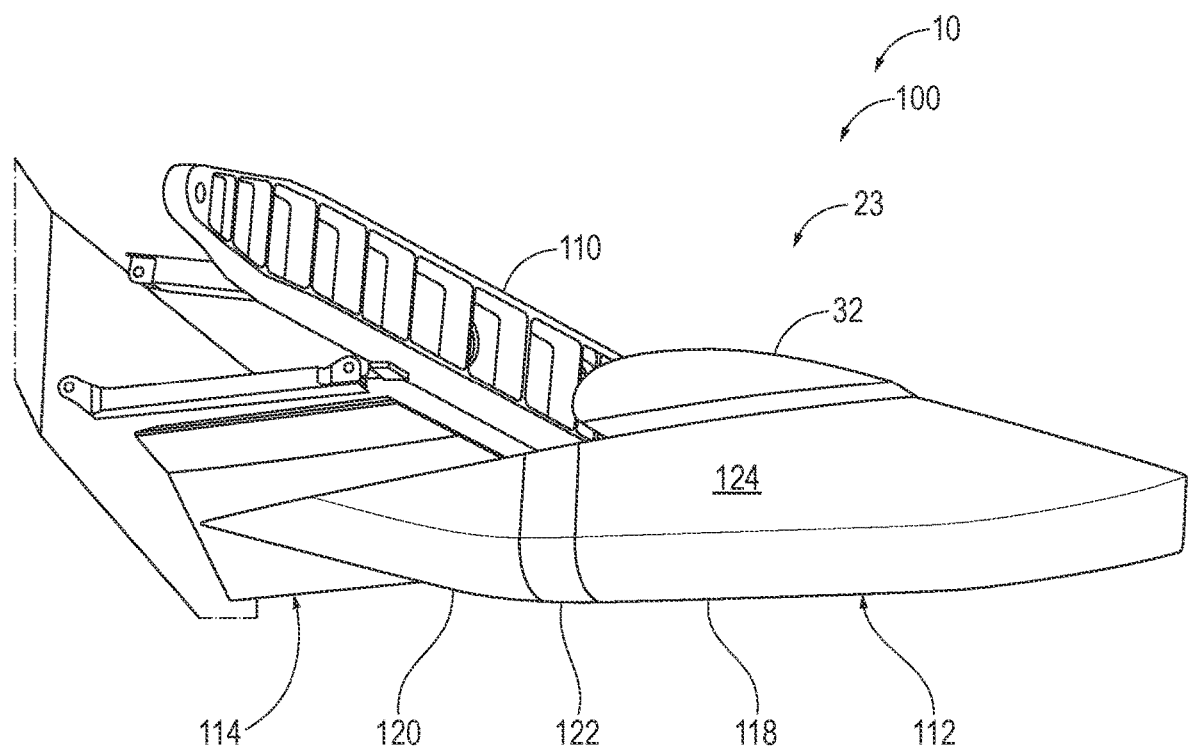
FIG. 7 illustrates a portion of an example wing assembly according to the present disclosure, including a flap support fairing, and shown with the inboard-most flap in a stowed position, and the landing gear door in a closed position.
Figure 8:
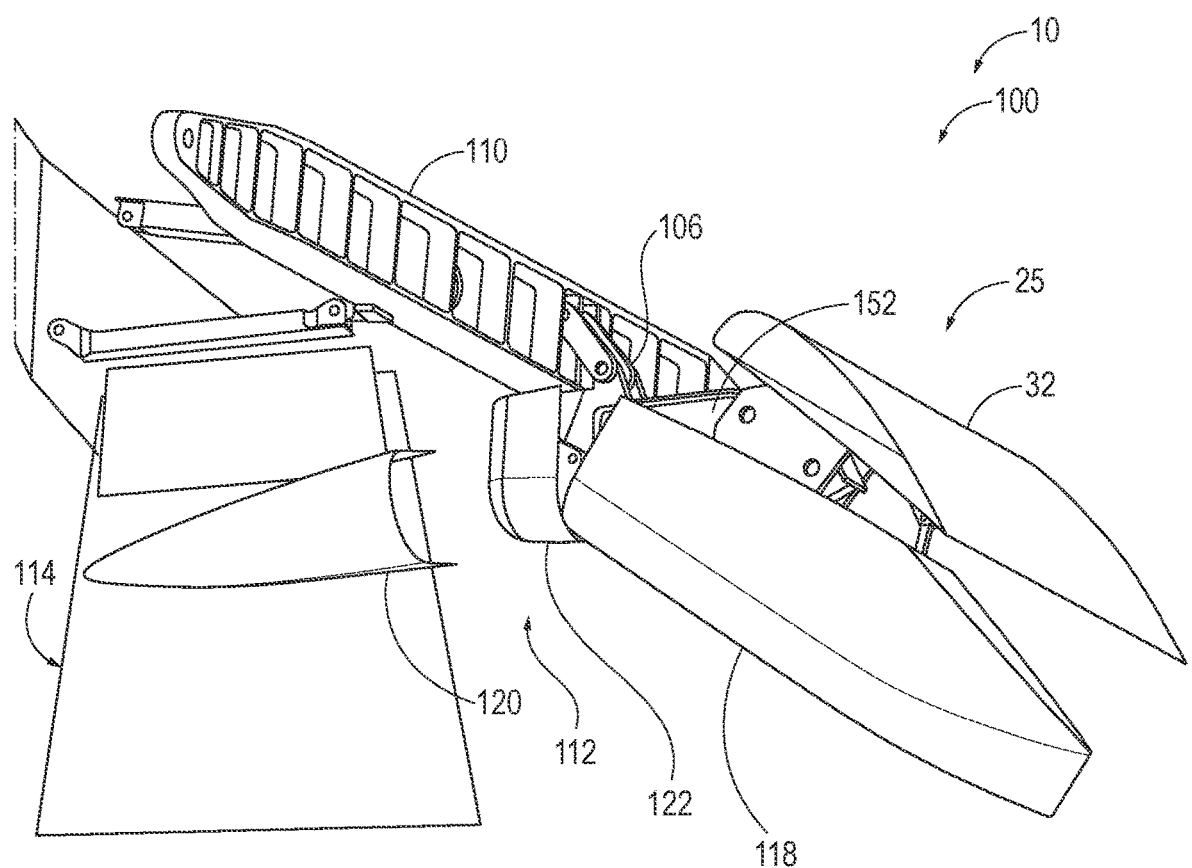
FIG. 8 illustrates the portion of an example wing assembly of FIG. 7, shown with the inboard-most flap in a deployed position and the landing gear door in an open position.

Turning now to FIGS. 6-8, illustrative non-exclusive examples of wing assemblies 100 are illustrated. Where appropriate, the reference numerals from the schematic illustration of FIG. 5 are used to designate corresponding parts of the examples of FIGS. 6-8; however, the examples of FIGS. 6-8 are non-exclusive and do not limit wing assemblies 100 to the illustrated embodiments of FIGS. 6-8. That is, wing assemblies 100 may incorporate any number of the various aspects, configurations, characteristics, properties, etc. of wing assemblies 100 that are illustrated in and discussed with reference to the schematic representation of FIG. 5 and/or the embodiments of FIGS. 6-8, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 6-8.

FIG. 6 illustrates select components of an example wing assembly 100, as shown from a top rear perspective of the wing assembly 100, whose inboard-most inboard-flap support 106 is mounted to the landing gear beam 110 and extends through the spoiler beam 128 between an inboard spoiler-beam portion 132 and an outboard spoiler-beam portion 130. In FIG. 6, the example wing assembly 100 is shown corresponding to the inboard-most flap 32 being in its stowed position 23. The inboard-most actuator 140 of the example wing assembly of FIG. 6 comprises a rotary actuator 142 that is mounted to the inboard-most inboard-flap support 106. Because of their size and orientation, rotary actuators 142 may be positioned in compact volumes, such as between the landing gear beam 110 and the spoiler beam 128 without significant redesign of these components being needed, thereby providing for a much more compact flap assembly and overall wing in the chord-wise direction.

In the example of FIG. 6, the inboard-most inboard-flap support 106 comprises an inboard flap-support rib 144 and an outboard flap-support rib 146, and the rotary actuator 142 is mounted to at least one of the inboard flap-support rib 144 and the outboard flap-support rib 146. In such examples, the wing assembly 100 also comprises a drive arm 148 that is operatively coupled between the rotary actuator 142 and the inboard-most flap 32 to move the inboard-most flap 32 between the stowed position 23 and the range of deployed positions 25, and the drive arm 148 extends between the inboard flap-support rib 144 and the outboard flap-support rib 146.

In operation, the example wing assembly 100 of FIG. 6 deploys the inboard-most flap 32 from the stowed position (shown) toward the range of deployed positions as a result of the rotary actuator 142 causing the drive arm 148 to travel aftward such that the inboard-most flap 32 pivots about the inboard-most inboard-flap support 106.

Select components of another example wing assembly 100 are shown from a bottom rear perspective view in FIGS. 7 and 8. The example wing assembly 100 of FIGS. 7 and 8 comprises a landing gear door 114 and an inboard-most inboard-flap-support fairing 112. The inboard-most inboard-flap-support fairing 112 comprises an aft fairing-portion 118 that is fixed relative to the inboard-most flap 32, a fixed fairing-portion 122 that is fixed relative to the inboard-most inboard-flap support 106, and a forward fairing-portion 120 that is fixed relative to, or integral with, the landing gear door 114. As seen in FIG. 8, the inboard-most inboard-flap support 106 comprises a track 152, and the inboard-most actuator 140 (not pictured) is configured to move the inboard-most flap 32 along the track 152 between the stowed position 23 (FIG. 7) and the range of deployed positions 25 (FIG. 8).

Aspects of the example wing assembly 100 of FIG. 6 may be incorporated into the example wing assembly 100 of FIGS. 7 and 8, and aspects of the example wing assembly 100 of FIGS. 7 and 8 may be incorporated into the example wing assembly 100 of FIG. 6.

Illustrative, non-exclusive examples of inventive subject matter according to the present disclosure are described in the following enumerated paragraphs:

A. A wing assembly (100) for an aircraft (10), the wing assembly (100) comprising:
  one or more wing support structures (24);
  an inboard-most flap (32) comprising an inboard edge (102) and an outboard edge (104); and
  one or more flap supports (28) that operatively couple the inboard-most flap (32) to the one or more wing support structures (24), wherein the one or more flap supports (28) comprise at least an inboard-most inboard-flap support (106) that is outboard of the inboard edge (102) of the inboard-most flap (32), and wherein the inboard-most flap (32) is configured to move relative to the one or more flap supports (28) between a stowed position (23) and a range of deployed positions (25).

A1. The wing assembly (100) of paragraph A, wherein the one or more wing support structures (24) comprise a landing gear beam (110) configured to support a landing gear (116), and wherein the inboard-most inboard-flap support (106) is mounted to the landing gear beam (110).

A2. The wing assembly (100) of any of paragraphs A-A1, further comprising:
  a landing gear door (114) configured to be selectively opened for deployment of a/the landing gear (116) and closed for stowage of the landing gear (116); and
  an inboard-most inboard-flap-support fairing (112) operatively mounted relative to the inboard-most inboard-flap support (106), wherein the inboard-most inboard-flap-support fairing (112) comprises an aft fairing-portion (118) and a forward fairing-portion (120), wherein the aft fairing-portion (118) is fixed relative to and moves with the inboard-most flap (32), and wherein the forward fairing-portion (120) is fixed relative to and moves with the landing gear door (114).

A2.1. The wing assembly (100) of paragraph A2 when depending from paragraph A1, wherein the landing gear beam (110) is associated with the landing gear (116).

A2.2. The wing assembly (100) of any of paragraphs A2-A2.1, wherein the inboard-most inboard-flap-support fairing (112) further comprises a fixed fairing-portion (122) fixed relative to the inboard-most inboard-flap support (106).

A2.2.1. The wing assembly (100) of paragraph A2.2, wherein the fixed fairing-portion (122) is mounted to the inboard-most inboard-flap support (106).

A2.2.2. The wing assembly (100) of any of paragraphs A2.2-A2.2.1, wherein the aft fairing-portion (118), the forward fairing-portion (120), and the fixed fairing-portion (122) define a continuous fairing surface (124) when the landing gear door (114) is closed and the inboard-most flap (32) is in the stowed position (23).

A3. The wing assembly (100) of any of paragraphs A-A2.2.2, wherein the one or more wing support structures (24) comprise a spoiler beam (128) configured to support a spoiler (34), and wherein the inboard-most inboard-flap support (106) extends through the spoiler beam (128).

A3.1. The wing assembly (100) of paragraph A3, wherein the spoiler beam (128) comprises an inboard spoiler-beam portion (132) and an outboard spoiler-beam portion (130), and wherein the inboard-most inboard-flap support (106) extends between the inboard spoiler-beam portion (132) and the outboard spoiler-beam portion (130).

A3.2. The wing assembly (100) of any of paragraphs A3-A3.1, wherein the inboard-most inboard-flap support (106) is coupled to the spoiler beam (128).

A4. The wing assembly (100) of any of paragraphs A-A3.2, further comprising one or more inboard-most-flap actuators (134) operatively coupled between the one or more wing support structures (24) and the inboard-most flap (32), wherein the one or more inboard-most-flap actuators (134) are configured to operatively move the inboard-most flap (32) between the stowed position (23) and the range of deployed positions (25).

A4.1. The wing assembly (100) of paragraph A4, wherein the one or more inboard-most-flap actuators (134) comprises an inboard-most actuator (140) associated with the inboard-most inboard-flap support (106).

A4.1.1. The wing assembly (100) of paragraph A4.1 when depending from paragraphs A1 and A3, wherein the inboard-most actuator (140) is positioned between the landing gear beam (110) and the spoiler beam (128).

A4.1.2. The wing assembly (100) of any of paragraphs A4.1-A4.1.1, wherein the inboard-most actuator (140) comprises a rotary actuator (142) mounted to the inboard-most inboard-flap support (106).

A4.1.2.1. The wing assembly (100) of paragraph A4.1.2, wherein the inboard-most inboard-flap support (106) comprises an inboard flap-support rib (144) and an outboard flap-support rib (146), wherein the rotary actuator (142) is mounted to at least one of the inboard flap-support rib (144) and the outboard flap-support rib (146), wherein the wing assembly (100) further comprises a drive arm (148) operatively coupled between the rotary actuator (142) and the inboard-most flap (32) to move the inboard-most flap (32) between the stowed position (23) and the range of deployed positions (25), and wherein the drive arm (148) extends between the inboard flap-support rib (144) and the outboard flap-support rib (146).

A4.1.3. The wing assembly (100) of any of paragraphs A4.1-A4.1.1, wherein the inboard-most inboard-flap support (106) comprises a track (152), and wherein the inboard-most actuator (140) is configured to move the inboard-most flap (32) along the track (152) between the stowed position (23) and the range of deployed positions (25).

A5. The wing assembly (100) of any of paragraphs A-A4.1.3, wherein the one or more flap supports (28) further comprise an outboard-most inboard-flap support (108) that is outboard of the inboard-most inboard-flap support (106) and that is inboard of the outboard edge (104) of the inboard-most flap (32).

A5.1. The wing assembly (100) of paragraph A5, wherein the inboard-most flap (32) has a flap length (126), wherein the inboard-most inboard-flap support (106) is positioned outboard of the inboard edge (102) by X percentage of the flap length (126), and wherein the outboard-most inboard-flap support (108) is positioned inboard of the outboard edge (104) within X±10 percentage of the flap length (126).

A5.1.1. The wing assembly (100) of paragraph A5.1, wherein X is 10-40 inclusive.

A6. An aircraft (10), comprising:
a fuselage (16); and
a wing (12) supported by the fuselage (16) and comprising the wing assembly (100) of any of paragraphs A-A5.1.1.

A6.1. The aircraft (10) of paragraph A6, wherein none of the one or more flap supports (28) extend into or are positioned within the fuselage (16), or a wing-body fairing (52).

A6.2. The aircraft (10) of any of paragraphs A6-A6.1 when depending from paragraph A4.1, wherein the inboard-most actuator (140) is not positioned within the fuselage (16), or a/the wing-body fairing (52).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A wing assembly for an aircraft, the wing assembly comprising:
   one or more wing support structures comprising a landing gear beam configured to support a landing gear;
   an inboard-most flap comprising an inboard edge and an outboard edge;
   one or more flap supports that operatively couple the inboard-most flap to the one or more wing support structures, wherein the one or more flap supports comprise at least an inboard-most inboard-flap support that is outboard of the inboard edge of the inboard-most flap, and wherein the inboard-most flap is configured to move relative to the one or more flap supports between a stowed position and a range of deployed positions, wherein the inboard-most inboard-flap support is mounted to the landing gear beam;
   a landing gear door configured to be selectively opened for deployment of the landing gear and closed for stowage of the landing gear; and
   an inboard-most inboard-flap-support fairing operatively mounted relative to the inboard-most inboard-flap support, wherein the inboard-most inboard-flap-support fairing comprises an aft fairing-portion and a forward fairing-portion, wherein the aft fairing-portion is fixed relative to and moves with the inboard-most flap, and wherein the forward fairing-portion is fixed relative to and moves with the landing gear door.

2. The wing assembly of claim 1, wherein the landing gear beam is associated with the landing gear.

3. The wing assembly of claim 1, wherein the inboard-most inboard-flap-support fairing further comprises a fixed fairing-portion fixed relative to the inboard-most inboard-flap support.

4. The wing assembly of claim 3, wherein the fixed fairing-portion is mounted to the inboard-most inboard-flap support.

5. The wing assembly of claim 3, wherein the aft fairing-portion, the forward fairing-portion, and the fixed fairing-portion define a continuous fairing surface when the landing gear door is closed and the inboard-most flap is in the stowed position.

6. The wing assembly of claim 1, wherein the one or more wing support structures comprise a spoiler beam configured to support a spoiler, and wherein the inboard-most inboard-flap support extends through the spoiler beam.

7. The wing assembly of claim 6, wherein the spoiler beam comprises an inboard spoiler-beam portion and an outboard spoiler-beam portion, and wherein the inboard-most inboard-flap support extends between the inboard spoiler-beam portion and the outboard spoiler-beam portion.

8. The wing assembly of claim 7, wherein the inboard-most inboard-flap support is coupled to the spoiler beam.

9. The wing assembly of claim 1, further comprising one or more inboard-most-flap actuators operatively coupled between the one or more wing support structures and the inboard-most flap, wherein the one or more inboard-most-flap actuators are configured to operatively move the inboard-most flap between the stowed position and the range of deployed positions.

10. The wing assembly of claim 9, wherein the one or more inboard-most-flap actuators comprises an inboard-most actuator associated with the inboard-most inboard-flap support, wherein the one or more wing support structures comprise a spoiler beam configured to support a spoiler, wherein the inboard-most inboard-flap support extends through the spoiler beam, and wherein the inboard-most actuator is positioned between the landing gear beam and the spoiler beam.

11. The wing assembly of claim 10, wherein the inboard-most actuator comprises a rotary actuator mounted to the inboard-most inboard-flap support.

12. The wing assembly of claim 11, wherein the inboard-most inboard-flap support comprises an inboard flap-support rib and an outboard flap-support rib, wherein the rotary actuator is mounted to at least one of the inboard flap-support rib and the outboard flap-support rib, wherein the wing assembly further comprises a drive arm operatively coupled between the rotary actuator and the inboard-most flap to move the inboard-most flap between the stowed position and the range of deployed positions, and wherein the drive arm extends between the inboard flap-support rib and the outboard flap-support rib.

13. The wing assembly of claim 11, wherein the inboard-most inboard-flap support comprises a track, and wherein the inboard-most actuator is configured to move the inboard-most flap along the track between the stowed position and the range of deployed positions.

14. The wing assembly of claim 1, wherein the one or more flap supports further comprise an outboard-most inboard-flap support that is outboard of the inboard-most inboard-flap support and that is inboard of the outboard edge of the inboard-most flap, wherein the inboard-most flap has a flap length, wherein the inboard-most inboard-flap support is positioned outboard of the inboard edge by X percentage of the flap length, and wherein the outboard-most inboard-flap support is positioned inboard of the outboard edge within X+10 percentage of the flap length.

15. The wing assembly of claim 14, wherein X is 10-40 inclusive.

16. An aircraft, comprising:
a fuselage; and
a wing supported by the fuselage and comprising the wing assembly of claim 1.

17. The aircraft of claim 16, wherein none of the one or more flap supports extend into or are positioned within the fuselage, or a wing-body fairing.

18. A wing assembly for an aircraft, the wing assembly comprising:
one or more wing support structures;
an inboard-most flap comprising an inboard edge and an outboard edge;
one or more flap supports that operatively couple the inboard-most flap to the one or more wing support structures, wherein the one or more flap supports comprise at least an inboard-most inboard-flap support that is outboard of the inboard edge of the inboard-most flap, and wherein the inboard-most flap is configured to move relative to the one or more flap supports between a stowed position and a range of deployed positions;
a landing gear door configured to be selectively opened for deployment of a landing gear and closed for stowage of the landing gear; and
an inboard-most inboard-flap-support fairing operatively mounted relative to the inboard-most inboard-flap support, wherein the inboard-most inboard-flap-support fairing comprises an aft fairing-portion and a forward fairing-portion, wherein the aft fairing-portion is fixed relative to and moves with the inboard-most flap, and wherein the forward fairing-portion is fixed relative to and moves with the landing gear door.

19. The wing assembly of claim 18, wherein the inboard-most inboard-flap-support fairing further comprises a fixed fairing-portion fixed relative to the inboard-most inboard-flap support, wherein the fixed fairing-portion is mounted to the inboard-most inboard-flap support, and wherein the aft fairing-portion, the forward fairing-portion, and the fixed fairing-portion define a continuous fairing surface when the landing gear door is closed and the inboard-most flap is in the stowed position.

20. An aircraft, comprising:
a fuselage; and
a wing supported by the fuselage and comprising the wing assembly of claim 18.

* * * * *